(12) United States Patent
Frick et al.

(10) Patent No.: US 6,524,652 B2
(45) Date of Patent: Feb. 25, 2003

(54) STORAGE-STABLE ISOCYANATE BINDERS CONTAINING LATENT CATALYSTS

(75) Inventors: Theodore Frick, Moon Township, PA (US); Ernst-Martin Hoppe, Bergisch Gladbach (DE); Manfred Kapps, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/957,845

(22) Filed: Sep. 21, 2001

(65) Prior Publication Data

US 2002/0114892 A1 Aug. 22, 2002

(30) Foreign Application Priority Data

Sep. 26, 2000 (DE) .......................... 100 47 485

(51) Int. Cl.[7] .............. B05D 3/02; B05D 3/12
(52) U.S. Cl. ...................... 427/370; 393/397
(58) Field of Search ............... 427/370, 393, 427/397

(56) References Cited

U.S. PATENT DOCUMENTS

| | | | |
|---|---|---|---|
| 4,331,778 A | 5/1982 | Sommerfeld et al. | 521/129 |
| 4,608,407 A | 8/1986 | Kerimis et al. | 524/14 |
| 4,778,845 A | 10/1988 | Tschan et al. | 524/710 |
| 4,935,457 A | 6/1990 | Metzner et al. | 524/14 |
| 5,002,713 A | 3/1991 | Palardy et al. | 264/109 |
| 5,550,191 A | 8/1996 | Hung et al. | 525/127 |
| 6,007,649 A | 12/1999 | Haas et al. | 156/62.2 |
| 6,020,429 A | 2/2000 | Yang et al. | 525/127 |
| 6,025,029 A | 2/2000 | Merz et al. | 427/372.2 |

FOREIGN PATENT DOCUMENTS

| | | |
|---|---|---|
| DE | 27 11 958 | 9/1978 |
| DE | 42 29 396 | 6/1997 |
| EP | 107260 | 5/1984 |
| EP | 0 133 680 | 3/1985 |
| EP | 0 226287 | 6/1987 |
| EP | 0 264 675 | 4/1988 |
| GB | 1387454 | 3/1954 |
| JP | 11-071565 | 3/1999 |
| WO | 97/28202 | 8/1997 |

Primary Examiner—Erma Cameron
(74) Attorney, Agent, or Firm—Joseph C. Gil; N. Denise Brown

(57) ABSTRACT

The present invention relates to a process for the production of derived timber products by applying a storage-stable binder to materials containing lignocellulose and heating this mixture under pressure. These storage-stable binders comprise a polyisocyanate and an amine catalysts. The invention also relates to these storage-stable binders.

7 Claims, No Drawings

STORAGE-STABLE ISOCYANATE BINDERS CONTAINING LATENT CATALYSTS

BACKGROUND OF THE INVENTION

This invention relates to a process for the production of derived timber products. This process comprises applying a binder to lignocellulose containing materials and heating this mixture under pressure. Suitable binders are storage-stable and comprise a polyisocyanate and an amine catalyst.

Derived timber products, for example chipboard, laminated board or other moldings are usually produced by hot pressing the inorganic or organic raw material, for example a mass of wood chips, wood fibers and/or other material containing lignocellulose, in a "mixed gluing" process with polyisocyanates and water, optionally polyols or other binders such as urea/formaldehyde or phenol/formaldehyde resins. Using polyisocyanates as the binder improves the stability and moisture performance of the products and enhances the mechanical properties thereof. As disclosed, for example, in DE-OS 21 09 686, polyisocyanates furthermore possess wide-ranging processing advantages.

Catalysts of the type known per se from polyurethane chemistry, for example those stated in DE-OS 28 54 384, pp. 26–29 and 31–33, may in principle also be used in prior art processes (c.f. for example DE-AS 27 11 958) in order to shorten pressing times. This is of particular importance in "one-daylight" presses. However, when catalysts are used, due to the immediate onset of catalyst action on the reactive NCO groups, unwanted foaming and premature setting generally occur during mixing of the components and storage of the isocyanate-glued chips. Consequently, it is generally necessary to dispense with the use of catalysts and accept longer pressing times.

EP-A 133 680 discloses a process for the production of derived timber products using polyurethanes as binders, in which tertiary or quaternary ammonium phosphonates or quaternary ammonium phosphates are used as heat-activated catalysts. However, the reduction in pressing time observable when these catalysts are used is not sufficient for economic performance of the process. Sufficiently short pressing times likewise cannot be achieved with the processes described in DE-OS 42 29 396 and DE-OS 34 38 735 for the production of chipboard or fiber board using polyisocyanates as the binder.

DE-OS 196 03 330 describes a process for the production of derived timber products using polyisocyanates as the binder which also use a latent catalyst system, in which the catalysts used are ammonium salts which are obtained by reacting amines with malonic acid. These activated binders effectively reduce pressing times and also function at elevated chip temperature. However, due to the deficient storage stability thereof in isocyanates, the catalyst must be added separately to the isocyanate directly before gluing. This separate addition entails additional plant costs and possible sources of error in the production process.

There was accordingly a need for a single component polyisocyanate binder containing catalyst which remains stable at elevated temperature over an extended period and permits pressing times to be shorted during hot pressing. Binder systems based on polyisocyanate and amine catalysts have now been discovered which are ideally suited to this purpose.

SUMMARY OF THE INVENTION

The present invention provides a process for the production of derived timber products comprising (a) applying a storage-stable binder comprising one or more polyisocyanates and one or more amine catalysts to materials containing lignocellulose; and (b) heating the product of (a) under pressure, thereby forming the resultant derived timber products.

Suitable amine catalysts to be used according to the invention preferably comprise those compounds which contain dimorpholino groups. Dimorpholinodiethyl ether and dimorpholinopolyethylene glycol are particularly preferred amine catalysts for the present invention. Dimorpholino compounds have already variously been suggested as storage-stable additives to moisture-curing MDI prepolymers or PMDI/epoxy resins (see, for example, EP-A 226 287, EP-A 668 302, EP-A 732 385, U.S. Pat. No. 5,075,405, EP-A 811 645 and/or WO 94/18265, the disclosures of which are herein incorporated by reference). EP-A 668 302 is believed to correspond to U.S. Pat. No. 5,550,191 which, at column 4, lines 45–69, discloses MDI prepolymers. More specifically, this reference discloses that the polyisocyanate and polyol, polyamino or polymercapto components are combined proportions so as to yield a urethane prepolymer characterized by an isocyanate content of from about 0.25 to 15%, preferably to about 10%, and most preferably from 1.5 to 5%. EP-A 732 385 is believed to correspond to U.S. Pat. No. 5,616,625 which, at column 5, lines 25–48 describes that the polyisocyanate and polyol, polyamino or polymercapto components are combined proportions so as to yield a urethane prepolymer characterized by an isocyanate content of from about 0.25 to 15%, preferably to about 10%, and most preferably from 1.5 to 5%. EP-A 811 645 is believed to correspond to U.S. Pat. No. 6,090,307 which, at column 3, lines 36–38, discloses prepolymer components having NCO group contents of between 4 and 20%, preferably between 6 to 18% and in particular between 7 and 13% by weight. However, the use of dimorpholino compounds in unmodified isocyanates for the production of storage-stable binders which are suitable for the production of derived timber products by hot pressing was not previously known.

The binders of the present invention generally contain from 0.01 to 30% by weight of catalyst, based on 100% by weight of the isocyanate. In a preferred variant, they contain 0.02 to 2% by weight, particularly preferably 0.05 to 1% by weight, based on 100% by weight of the isocyanate.

Addition of the catalyst to the isocyanate and subsequent mixing must proceed in the absence of moisture. The mixed binder system may be stored at temperatures of up to 40° C. for at least two months, and may also briefly be exposed to temperatures of up to 60° C. without there being any impairment of the binder properties.

Suitable isocyanate components which may be considered for the performance of the process according to the invention comprise aliphatic, cycloaliphatic, araliphatic, aromatic and heterocyclic polyisocyanates, as have been described by W. Siefken in *Justus Liebigs Annalen der Chemie*, 562, pp. 75–136, for example those of the formula

wherein:
n: represents a number from 2 to 4, preferably 2; and
Q represents an aliphatic hydrocarbon residue having 2 to 18 carbon atoms, preferably 6 to 10 carbon atoms, a cycloaliphatic hydrocarbon residue having 4 to 23 carbon atoms, preferably 5 to 13 carbon atoms, an aromatic hydrocarbon residue having 6 to 25 carbon atoms, preferably 6 to 13 carbon atoms, or an aralphatic hydrocarbon residue having 8 to 15 carbon atoms, preferably 8 to 13 carbon atoms.

Some examples of suitable polyisocyanates for the present invention, include compounds such as, for example, 4,4'-diphenylmethane diisocyanate, 1,3- and 1,4-phenylene diisocyanate, 2,4- and 2,6-tolylene diisocyanate and any desired mixtures of these isomers, 2,4'- and/or 4,4'-diphenylmethane diisocyanate, and any desired mixtures of these isomers or the polymeric types from this series.

Industrially readily available polyisocyanates are generally preferred. Such polyisocyanates include, for example, 2,4- and 2,6-tolylene diisocyanate and any desired mixtures of these isomers ("TDI"), and particularly preferably polyphenylpolymethylene polyisocyanates, as are produced by aniline/formaldehyde condensation and subsequent phosgenation ("crude MDI"). The polyisocyanates used may optionally also be modified. More highly cyclic isocyanates of the diphenylmethane diisocyanate series (pMDI grades) are particularly preferably used.

The process according to the invention may also be performed using prepolymers comprising terminal isocyanate groups (i.e. NCO-terminated prepolymer) and having an average molecular weight of approx. 275 to 2000, as are obtained in a manner known per se by reacting relatively high molecular weight or low molecular weight polyols with an excess of a suitable polyisocyanate.

Polyols which may be used in the preparation of the prepolymers include, for example, any relatively high molecular weight polyols conventionally used in polyurethane chemistry, in particular compounds comprising two to eight hydroxyl groups, especially those of molecular weights from 400 to 10,000, preferably from 550 to 5,000. Suitable examples of such compounds include polyesters, polyethers, polythioethers, polyacetals, polycarbonates and polyesteramides which comprise as a rule two to eight, but preferably two to four, hydroxyl groups, as are known per se for the production of homogeneous and cellular polyurethanes.

Suitable raw materials containing lignocellulose, which may be bound with the polyisocyanate/activator formulation according to the invention, include, for example, wood, bark, cork, bagasse, straw, flax, bamboo, esparto grass, rice husks, sisal and coconut fibers. The material may here assume the form of pellets, strands, chips, fibers or flour, and may have a water content of, for example, from 0 to 35% by weight, preferably of from 5 to 25% by weight, based on the 100% by weight of the lignocellulose containing material. The material is combined with the binder in a quantity of 1 to 100% by weight of binder, preferably of 2 to 12% by weight of binder, based on 100% by weight of the lignocellulose containing material. Generally, the lignocellulose containing material and the binder are combined under the action of pressure and heat, and are pressed into boards or moldings.

Multi-ply boards or moldings may also be produced in a similar manner from veneers, paper or fabrics. Multilayer boards or moldings made from veneers with central cores of strips, battens or bars, known as "wood core board", may be produced according to the invention by treating the veneers as described above with the isocyanate/activator formulation, and then pressing them with the central plies, generally at elevated temperature and elevated pressure. Temperatures of 80 to 250° C., in particular of 100 to 220° C., are preferably maintained during this process. The initial pressing pressure is also in this case preferably between 5 and 150 bar. The pressure generally declines towards 0 bar over the course of the pressing operation.

The polyisocyanate/activator formulations may also be used according to the invention in combination with the above-described polyhydroxyl compounds in an NCO/OH ratio of 1.1:1 to 10:1, and preferably of 1.5:1 to 5:1. It is possible in this case to use the two components separately or as a reactive mixture. Such combinations of polyisocyanate and polyhydroxyl compounds have practical significance as binders such as, for example, for binding cork scrap. It is also possible to add per se known blowing agents in a quantity of approx. 0.5 to 30% by weight, based on 100% by weight of the the binder composition (or impregnating agent). It is also possible to add other additives which influence foaming or the chemical reaction between polyisocyanates, lignocellulose containing material and any optionally present polyhydroxyl compounds. Such additives include, for example, stabilisers, which may be added in a quantity of 0.05 to 10% by weight, based on 100% by weight of the binder composition (or impregnating agent).

The polyisocyanate/activator formulations to be used as binders according to the invention may also be combined with, for example, the aqueous solutions of condensation products prepared from formaldehyde with urea and/or melamine and/or phenol hitherto predominantly used in the derived timber products industry (mixed gluing), as well as with other hitherto less commonly used binders and impregnating agents, such as, for example, spent sulfite liquor (lignin sulfonate or other industrial lignin solutions from wood pulping), or tanning agent type compounds such as tannin, where a mixing ratio (by weight) of the binders according to the invention with these additional binders of between 1:10 and 10:1, preferably of between 1:5 and 5:1, may be maintained and wherein the binders according to the invention and the additional binders may be used either separately or also as a mixture.

Such combinations are particularly advantageous in the production of multilayer boards having special properties. The outer layers may, for example, be combined with conventional adhesives (alone or together with the polyisocyanate binder) and one or more internal layers may be combined with the polyisocyanate binder to be used according to the invention (alone or together with conventional adhesives) and then pressed together.

Due to their outstanding mechanical properties, the boards or moldings based on raw materials containing lignocellulose or other organic and/or inorganic raw materials and produced according to the invention are primarily suitable for use in construction. In order to impart the resistance to fungal attack, insect infestation or the action of fire which is generally required for such boards or moldings, conventional commercial additives, for example, aqueous polyethylene emulsions of organic or inorganic protective agents, may be added in pure form or as a solution in a quantity of approx. 0.05 to 30% by weight, preferably of 0.5 to 20% by weight, based on 100% by weight of the binder composition. Solvents which may be considered are water or organic solvents, residual oils from petroleum processing, chlorinated hydrocarbons and the like. The quality of the gluing is not generally impaired as a consequence. Advantageously, unlike in phenol/formaldehyde resin glued boards, neither salt efflorescence nor "bleeding" occur in the materials produced according to the invention.

Due to the elevated adhesive power of the binders according to the invention, the moldings impregnated or bound therewith frequently have a tendency to adhere to the surfaces of the hot presses or molds. This may be avoided by release agents, which are added to the binder. Another solution involves applying the release agents in pure form or as a solution onto the metallic surfaces which come into contact with the pressed articles or onto the surface of the molding. External release agents which may be considered are any substances hitherto proposed for this purpose. Preferred compounds according to DE-OS 23 25 926 are, however, those which catalyse isocyanurate formation in isocyanates such as, for example, phenol Mannich bases, derivatives of hexahydrotriazine or alkali metal salts of carboxylic acids and/or soaps, optionally in solution, such as, for example, aqueous diethylene glycol. Another approach to preventing adhesion involves arranging a release layer between the pressed article and metallic surface of the press, wherein the release layer may consist of webs, films or comminuted forms of various raw materials (for example plastics, paper, wood, metal). As has already repeatedly been mentioned, substantial improvements, with regard both to mechanical properties and to processing, may be achieved in chipboard production with the isocyanate binders to be used according to the invention in comparison with conventional binders based on phenol/formaldehyde or urea/formaldehyde resins. In the case of wood chipboard, it is accordingly possible either to achieve an increase in flexural rigidity of up to 50% (combined with an improvement in other mechanical properties) when using the same quantity of the presently required isocyanate binder as required for phenol/formaldehyde or urea/formaldehyde resins. Alternatively, it is possible to achieve identical mechanical properties as result from phenol/formaldehyde or urea/formaldehyde resins while using the presently required isocyanate binders in an amount of from 25 to 70% less.

EXAMPLES

The following starting components used were:
A. Bis(dimethylaminoethyl) ether (commerically available as DABCO® DA20 from Air Products)
B. 1,8-Diazabicyclo[5.4.0]undec-7-ene (commercially available as PCCAT® DBU from Nitroil Europe Handels GmbH)
C. Acid-blocked 1,8-diazabicyclo[5.4.0]undec-7-ene (commercially available as PCCAT® DBU TA from Nitroil Europe Handels GmbH)
D. Dibutyltin dilaurate (DBTL) (commercially available as DABCO® T12 from Air Products)
E. Dimorpholinodiethyl ether (DMDEE) (commercially available as PCCAT® DMDEE from Nitroil Europe Handels GmbH)
F. Dimorpholinopolyethylene glycol (DMPEG) (commercially available as PCCAT® 1KSC from Nitroil Europe Handels GmbH)
G. Polyether of an OH value of 190, produced by reacting propylene glycol with propylene oxide and ethylene oxide
H. Polymeric MDI ("pMDI") having an NCO content of approx. 31.5 wt. %

The catalysts were initially tested by mixing 1% by weight, based on 100% by weight of the isocyanate, of the particular catalyst (A, B, C, D, E or F) into isocyanate H. The mixing and reaction behavior were observed over a period of several hours. The results are shown in Table 1.

Those products which passed the initial testing were subjected to a storage test, in which the samples were stored at elevated temperature (40° C.) over a period of two months. These systems were prepared by mixing the amount of catalyst as shown in Table 2 with isocyanate H. (The weight basis for the catalyst was 100% by weight of the isocyanate component.) After storage over the two month perior, storage stability was evaluated on the basis of any increase in viscosity and loss of NCO. The results are shown in Table 2.

TABLE 1

| Catalyst | Observation | Result |
|---|---|---|
| A | Clear solution, but reaction occurred within 20 minutes | − |
| B | Reaction occurred during mixing | − |
| C | Reaction occurred within 10 minutes | − |
| D | Clear solution, no reaction | + |
| E | Clear solution, no reaction | + |
| F | Clear solution, no reaction | + |

TABLE 2

| System | Change in viscosity | NCO loss |
|---|---|---|
| 0.08% wt. D (pMDI + 0.08% wt. DBTL) | 281% | 4.3% |
| 0.10% wt. E (pMDI + 0.1% wt. DMDEE) | 5% | 0.6% |
| 0.20% wt. F (pMDI + 0.2% wt. DMPEG) | 15% | 0.4% |

It is clear from Table 2 that pMDI based wood binders which meet all storage stability requirements are obtained with DMDEE (catalyst E) and DMPEG (catalyst F). Catalysts A to C exhibited incompatibilities with pMDI even in the initial testing, while the viscosity of the mixture of pMDI and DBTL (catalyst D) rose sharply over the course of two months' storage at 40° C.

It may also occur that the catalyst is used as a stock solution. In this case, short-term storage stability at higher concentrations is required. Storage stability was tested of samples were prepared by mixing the catalyst (catalyst E or catalyst F) and isocyanate H, in the absence of moisture, and stored at 40° C. After storage, the storage stability was assessed visually. The test results are shown in Table 3.

TABLE 3

| System | Storage stability at a storage temperature of 40° C. |
|---|---|
| 10% wt. E (pMDI + 10% wt. DMDEE) | >2 weeks |
| 20% wt. E (pMDI + 20% wt. DMDEE) | >2 weeks |
| 10% wt. F (pMDI + 10% wt. DMPEG) | >2 weeks |
| 20% wt. F (pMDI + 20% wt. DMPEG) | >2 weeks |

It is clear that DMDEE and DMPEG may also be processed as stock solutions with storage stability of greater than 2 weeks at a catalyst concentration in pMDI of 20% by weight, based on 100% by weight of the isocyanate component.

Practical Examples relating to the production of 3 layer boards 4900 parts by weight of central layer chips consisting of a mixture of softwood and hardwood and having a moisture content of approx. 8% by weight were heated to a temperature of 60° C. and were mixed/glued at a temperature of 60° C. with either: (1) 240 parts by weight of binder mixtures prepared from isocyanate H and the catalysts (i.e. catalysts E and F) according to the invention, or (2) 264 parts by weight of binder mixtures which were prepared immediately before mixing/gluing and comprising 90% by weight of isocyanate H and 10% by weight of polyol G (a propylene glycol based polyether polyol having an OH number of 190). 2850 parts by weight of outer layer chips consisting of a mixture of softwood and hardwood and having a moisture content of approx. 15% by weight were heated to a temperature of 60° C. and were mixed/glued at a temperature of 60° C. with either: (1) 136 parts by weight of mixtures prepared from isocyanate H and the catalysts (i.e. catalysts E and F) according to the invention, or (2) 150 parts by weight of a mixture prepared from 90% by weight of isocyanate H and 10% by weight of polyol G. A three layer chipboard article of a size of 460×460 mm comprising a lower outer layer, a central layer and an upper outer layer was formed and pressed at 200° C. for either 1.87 minutes or for 1.6 minutes (see Table 4). The transverse tensile strength of the resultant chipboards (thickness 16 mm) after 2 hours' immersion in boiling water was determined. These 10 results are summarised in Table 4.

TABLE 4

| Binder | Transverse tensile strength after pressing for 1.87 minutes at a pressing temperature of 200° C. | Transverse tensile strength after pressing for 1.6 minutes at a pressing temperature of 200° C. |
|---|---|---|
| H | 0.22 MPa | Not measurable, crumbly |
| 90% by wt. H + 10% by wt. G | 0.20 MPa | 0.16 MPa |
| H + 0.1% by wt. E* | 0.12 MPa | 0.11 MPa |
| H + 0.2% by wt. F* | 0.19 MPa | 0.16 MPa |

*% by wt. of catalyst is based on 100% by weight of isocyanate H

It is clear that using isocyanate H (i.e. pure pMDI) as the sole wood binder does not permit a reduced pressing time of 1.6 minutes at a board thickness of 16 mm. The board exhibited steaming fissures when the press was opened after this reduced pressing time. The use of an additive (i.e. component G, a polyether polyol) to reduce pressing time permitted a shorter pressing time, but resulted in a 20% decrease in the transverse tensile strength. Using catalysts E and F according to the invention produced similar results; good quality boards were obtained at the 16% shorter pressing time and the drop in transverse tensile strength was only 9% or 16% respectively.

What is claimed is:

1. A process for the production of derived timber products comprising (a) applying a storage-stable binder comprising at least one polyisocyanate and at least one dimorpholino catalyst to lignocellulose containing materials, with the proviso that when said polyisocyanate comprises a prepolymer, the NCO group content exceeds 20% by weight; and (b) heating the combination formed in (a) under pressure, thereby forming the resultant timber product.

2. The process of claim 1, wherein said dimorpholino compound is selected from the group consisting of dimorpholinodiethyl ether, dimorpholinopolyethylene glycol and mixtures thereof.

3. The process of claim 1, wherein the storagestable binder comprises from about 0.01 to about 30% by weight of said dimorpholino catalyst, based on 100% by weight of said polyisocyanate.

4. The process of claim 1, wherein one or more binders selected from the group consisting of urea/formaldehyde resins, melamine/formaldehyde resins, phenol/formaldehyde resins and mixtures thereof, are additionally mixed with lignocellulose containing materials and heated under pressure.

5. The process of claim 1, wherein said storage-stable binder additionally comprises one or more components selected from the group consisting of release agents, wood preservatives, flame retardants, polyethylene dispersions, additives and auxiliary agents.

6. The process of claim 1, wherein said polyisocyanate comprises polymeric diphenylmethane diisocyanate (pMDI).

7. The process of claim 1, wherein polyisocyanate comprises one or more polymeric diphenylmethane diisocyanate modified by one or more polyether polyols, one or more polyester polyols or mixtures thereof, with the proviso that the NCO group content of the resultant prepolymer exceeds 20% by weight.

* * * * *